US 6,561,464 B2

(12) United States Patent
Cumby

(10) Patent No.: US 6,561,464 B2
(45) Date of Patent: May 13, 2003

(54) STAND FOR SUPPORTING BOUQUET HOLDER

(76) Inventor: Randy L. Cumby, Rte. 3, No. 35, Triple L Acres, Altus, OK (US) 73521

( * ) Notice: Subject to any disclaimer, the term of this patent is extended or adjusted under 35 U.S.C. 154(b) by 0 days.

(21) Appl. No.: 09/841,372

(22) Filed: Apr. 24, 2001

(65) Prior Publication Data
US 2002/0153457 A1 Oct. 24, 2002

(51) Int. Cl.$^7$ ................................................ A47G 7/00
(52) U.S. Cl. ................................................ 248/27.8
(58) Field of Search ..................... 248/27.8, 441.1, 248/442, 444, 444.1, 447.1, 116, 915; 211/13.1, 70.1, 42; D11/143, 146, 1

(56) References Cited

U.S. PATENT DOCUMENTS

| 185,468 A | 12/1876 | Archer |
| 342,675 A | 5/1886 | Braddock |
| 1,263,323 A | 4/1918 | Kaempf |
| 1,369,089 A | 2/1921 | Duff |
| 1,623,749 A * | 4/1927 | Pelkey ........................ 248/444 |
| 1,712,858 A | 5/1929 | Tsuchii |
| 1,752,655 A | 4/1930 | Scherotto |
| 1,801,058 A | 4/1931 | Sutcliffe |
| 1,827,731 A | 10/1931 | Churchill |
| 1,885,879 A | 11/1932 | Whittington |
| 1,946,779 A | 2/1934 | Conway |
| D98,549 S | 2/1936 | Sharp |
| 2,217,454 A | 10/1940 | Pfeiffer |
| 2,358,925 A | 9/1944 | Bacigalupi |
| D159,658 S | 8/1950 | McCallum et al. |
| 2,779,459 A | 1/1957 | Waterman |
| 3,158,524 A | 11/1964 | Tong |
| 3,164,344 A | 1/1965 | Whyte |
| 3,169,897 A | 2/1965 | Yue |
| 3,883,990 A | 5/1975 | Stidolph |
| 3,924,750 A | 12/1975 | Dunchock |
| 4,204,602 A | 5/1980 | Dunchock |
| 4,212,133 A | 7/1980 | Lufkin |
| 4,310,095 A | 1/1982 | Fontlladosa |
| 4,531,638 A | 7/1985 | Jacobozzi et al. |
| 4,584,213 A | 4/1986 | Rentowl |
| 4,773,173 A | 9/1988 | Christian |
| 4,917,240 A | 4/1990 | Roberts et al. |
| D320,324 S | 10/1991 | Siembieda et al. |

(List continued on next page.)

FOREIGN PATENT DOCUMENTS

| DE | 197805 | 1/1907 |
| DE | 2431336 | 8/1976 |
| GB | 674897 | 7/1952 |

OTHER PUBLICATIONS

American Floral Container, Inc., commercial brochure, published prior to Feb. 1997 (2 pages).
Lomey, advertisement for bouquet stands, published prior to Feb. 1997 (1 page).

(List continued on next page.)

Primary Examiner—Leslie A. Braun
Assistant Examiner—A. Joseph Wujciak, III
(74) Attorney, Agent, or Firm—Mary M. Lee

(57) ABSTRACT

A stand for supporting a bouquet holder with either a straight handle or a curved handle. The stand may be integrally formed of transparent plastic. The plastic is folded in at least two places to form a bottom panel, a front panel and a non-parallel back panel. The front panel is supported at an angle to the bottom panel and has an opening for receiving the stem of the bouquet holder. The back panel extends downwardly from the front panel or upwardly from the bottom panel and has a notched edge spaced a distance behind the front panel to receive the free end of the stem of the bouquet holder. This attractive stand can be used to support a bouquet holder during the creation of a flower arrangement therein, and to store, transport and display a floral arrangement in a bouquet holder.

26 Claims, 5 Drawing Sheets

U.S. PATENT DOCUMENTS

| | | |
|---|---|---|
| 5,165,534 A | 11/1992 | Kaufman et al. |
| 5,216,835 A | 6/1993 | Domurat |
| 5,217,117 A | 6/1993 | Tsuji |
| 5,244,700 A | 9/1993 | Banschick |
| 5,297,677 A | 3/1994 | Burian et al. |
| 5,301,463 A | 4/1994 | Domurat |
| 5,380,568 A | 1/1995 | Banschick |
| 5,454,189 A | 10/1995 | Graham et al. |
| 5,522,574 A | 6/1996 | Maglione |
| 5,878,982 A | 3/1999 | Cumby et al. |
| 5,884,889 A * | 3/1999 | Crosby ................ 248/460 |

OTHER PUBLICATIONS

Tapscott's spring 1997 catalog, published prior to Feb. 1997, pp. 171–173, 175 (5 pages).

*A Flower, Symbol of Joy and Hope, is the Heart of a Wedding Celebration*, article appearing in The Professional Floral Designer, Jan./Feb. 1997, pp. 34–36 (3 pages).

*Make a Sweeping Statement*, article appearing in The Professional Floral Designer, Jan./Feb. 1997, p. 37 (1 page).

*Three Essentials for Developing a Competitive Edge in the Bridal Market*, article appearing in The Professional Floral Designer, Jan./Feb. 1997, pp. 38–39 (2 pages).

Vacuum Orna–Metal, Inc., advertisement appearing in Florist magazene, Aug. 1996, pp. 40–41 (2 pages).

Smithers–Oasis U.S.A., advertisement appearing in Florist magazene, May 1996, pp. 54–55 (2 pages).

Vacuum Orna–Metal, Inc., advertisement appearing in Florist magazene, May, 1996, p. 93 (inside back cover) (1 page).

Reauco, Inc., advertisement appearing in Professional Floral Designer, Nov./Dec. 1995, p. 30 (1 page).

Excelsior Plastics Industry, advertisement appearing in Professional Floral Designer, Sep./Oct. 1995, p. 39 (1 page).

Diamond–Line Containers, advertisement appearing in Professional Floral Designer, Sep./Oct. 1995, pp. 56–57 (2 pages).

Lomey Manufacturing Corp., advertisement appearing in Professional Floral Designer, Sep./Oct. 1995, p. 97 (inside back cover) (1 page).

* cited by examiner

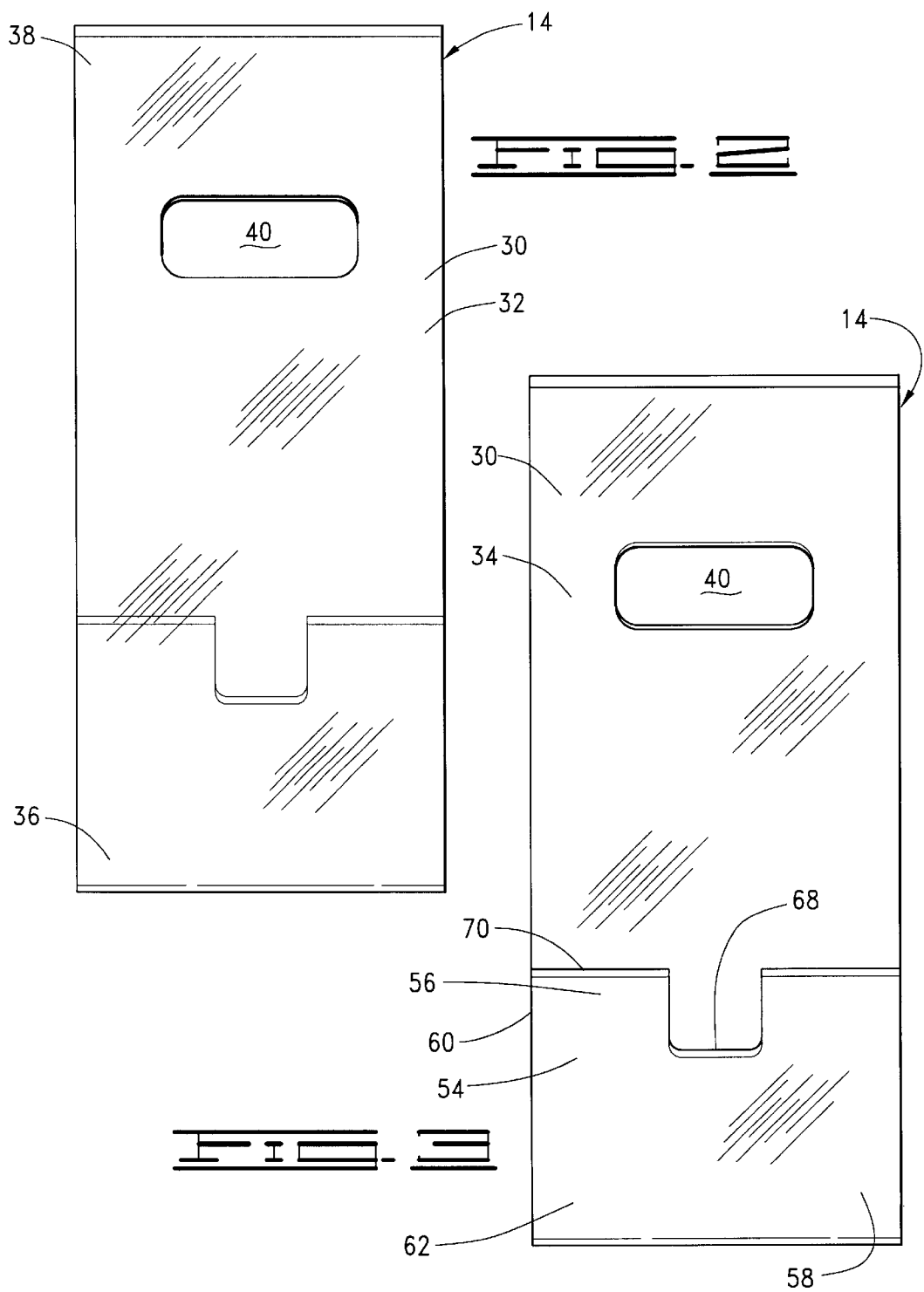

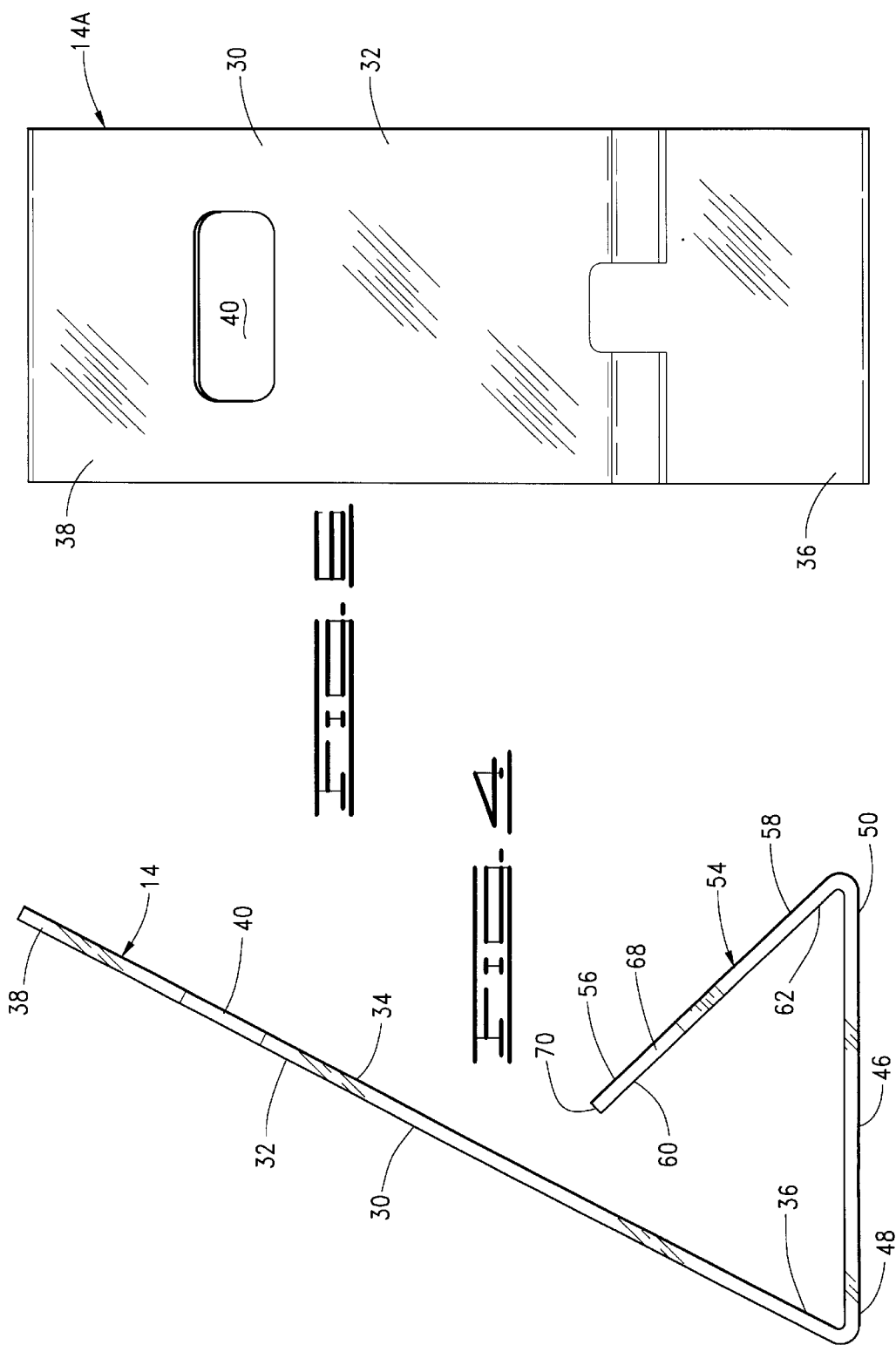

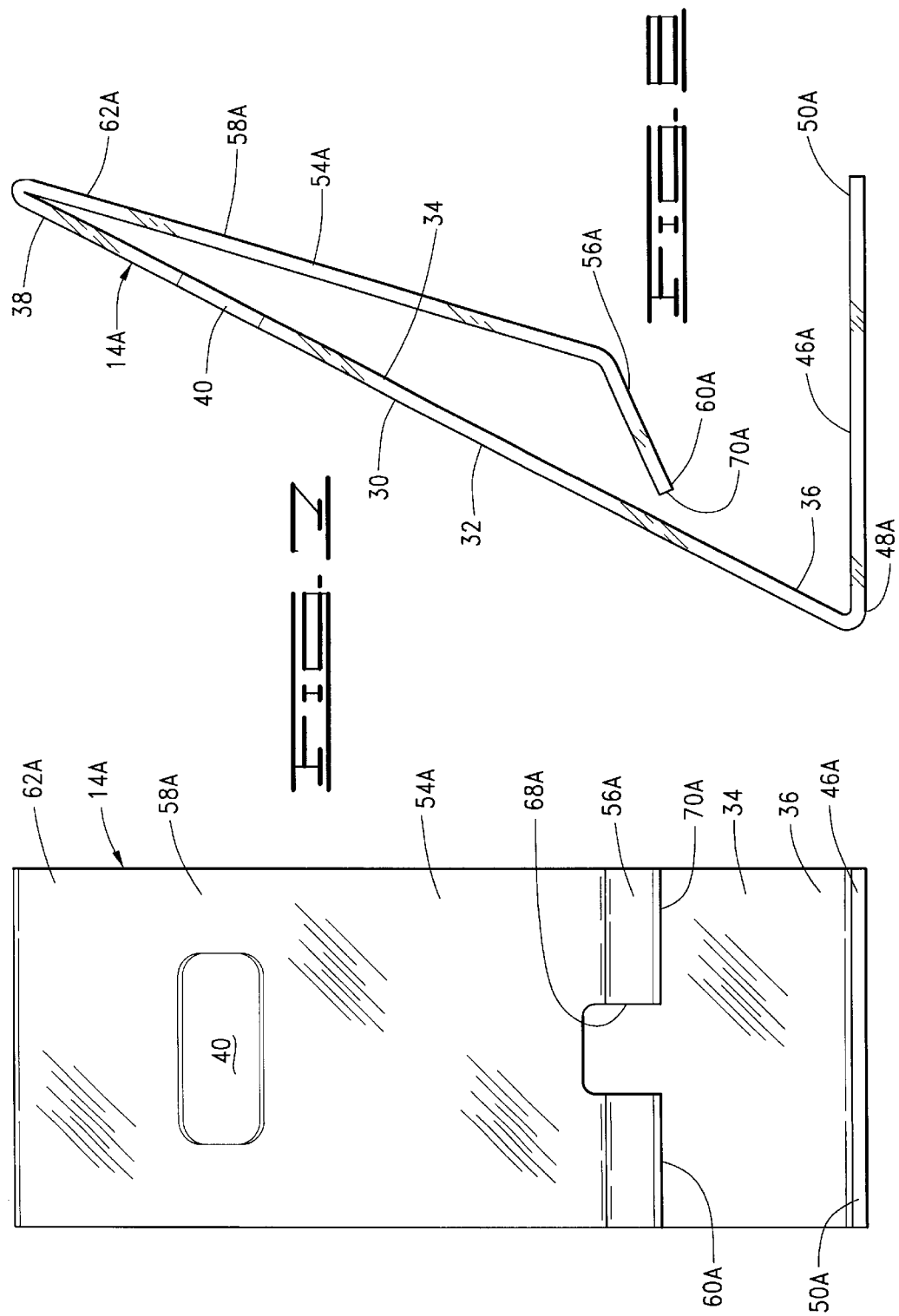

STAND FOR SUPPORTING BOUQUET HOLDER

FIELD OF THE INVENTION

The present invention relates generally to floral devices and, more particularly, to stands for supporting floral devices.

SUMMARY OF THE INVENTION

The present invention comprises a stand for supporting a bouquet holder, wherein the bouquet holder comprises a floral portion and an elongate stem. The floral portion is attached to one end of the stem, and the other end of the stem is a free end. The stand comprises a front panel having a front face and a rear face. The front panel defines at least one receiving opening adapted to receive the free end of the stem of the bouquet holder so that the floral portion is supported on the front face of the front panel and a portion of the stem extends behind the front panel. The stand further comprises a back panel comprising a first panel portion supported non-parallel to the front panel. The first panel portion has a notched edge spaced a distance behind the front panel and adapted to receive the free end of the stem of the bouquet holder so that the bouquet holder is stabilized in the stand.

Still further, the present invention is directed to a bouquet holder assembly. The assembly includes a bouquet holder and a stand. The bouquet holder comprises a floral portion and an elongate stem, wherein the floral portion is attached to one end of the stem, and wherein the other end of the stem is a free end. The stand comprises a front panel having a front face and a rear face. The front panel defines at least one receiving opening adapted to receive the free end of the stem of the bouquet holder so that the floral portion is supported on the front face of the front panel and a portion of the stem extends behind the front panel. The stand includes a back panel comprising a first panel portion supported non-parallel to the front panel. The first panel portion has a notched edge spaced a distance behind the front panel and adapted to receive the free end of the stem of the bouquet holder so that the bouquet holder is stabilized in the stand.

BRIEF DESCRIPTION OF THE DRAWINGS

FIG. 2 is a front elevational view of the stand shown in FIG. 1. The bouquet holder is omitted.

FIG. 3 is a rear elevational view of the stand shown in FIG. 2.

FIG. 4 is a side elevational view of the stand shown in FIG. 2.

FIG. 6 is a front elevational view of the stand shown in FIG. 5. The bouquet holder is omitted.

FIG. 7 is a rear elevational view of the stand shown in FIG. 6.

FIG. 8 is a side elevational view of the stand shown in FIG. 6.

DETAILED DESCRIPTION OF THE PREFERRED EMBODIMENT

Florists create floral arrangements such as floral sprays and bouquets using a variety of devices, including bouquet holders. During assembly of the floral arrangement, the stems of flowers, picks, wires and other floral accessories are pressed into the bouquet holder. There is a need for a floral stand that can support the floral device while the florist works on it, as this allows the florist to have both hands free to manipulate the delicate flowers and various accessories.

In accordance with the present invention a stand is provided which supports the floral device in an upright position on virtually any work surface chosen by the florist. The stand of this invention can be used to support several different floral devices, and allows convenient manipulation of wires and ribbons and the like.

Moreover, due to its solid sturdy construction, the stand of this invention can be used to store and to transport the fully assembled floral arrangement. This eliminates the need to remove the arrangement from the stand and package it safely for shipment, which reduces the likelihood that the arrangement will be damaged.

Still further, the simple elegant appearance of the stand of this invention provides an aesthetically pleasing display stand for the arrangement. This eliminates yet another opportunity for damage to the arrangement and the delicate flowers within it. This also simplifies the use of the arrangement at events, such as weddings, where it may be necessary to rapidly set up and disassemble a grouping of large floral arrangements with minimal disruption of the ceremony.

The Embodiment of FIGS. 1–4

Figure 1:
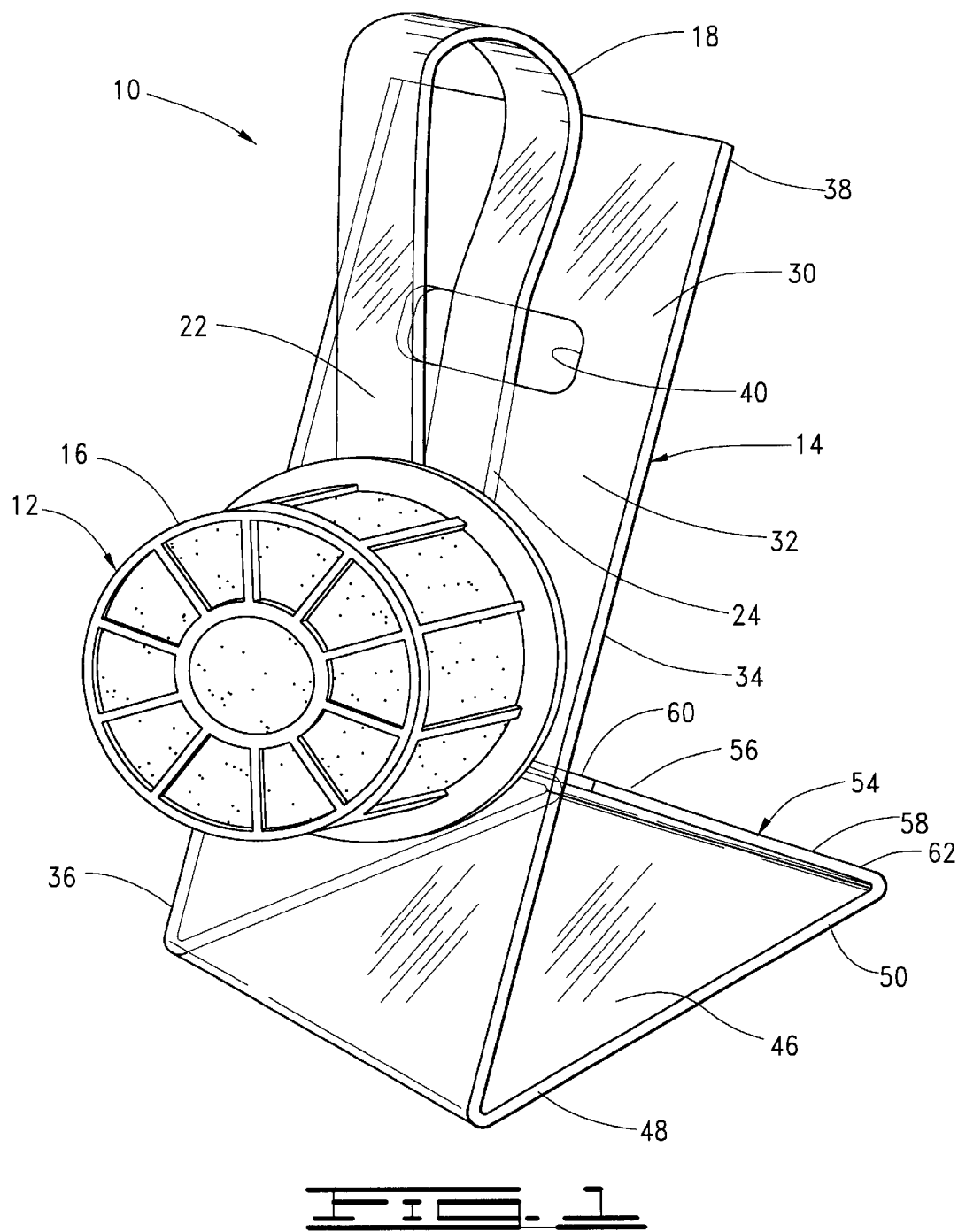
FIG. 1 is a right, frontal perspective view of a stand constructed in accordance with a first embodiment of the present invention. A bouquet holder with a curved handle is shown supported in the stand.

With reference now to the drawings in general and to FIG. 1 in particular, there is shown therein a bouquet holder assembly constructed in accordance with the present invention and designated generally by the reference numeral 10. The assembly 10 generally comprises a bouquet holder 12 and a stand 14.

Figure 5:
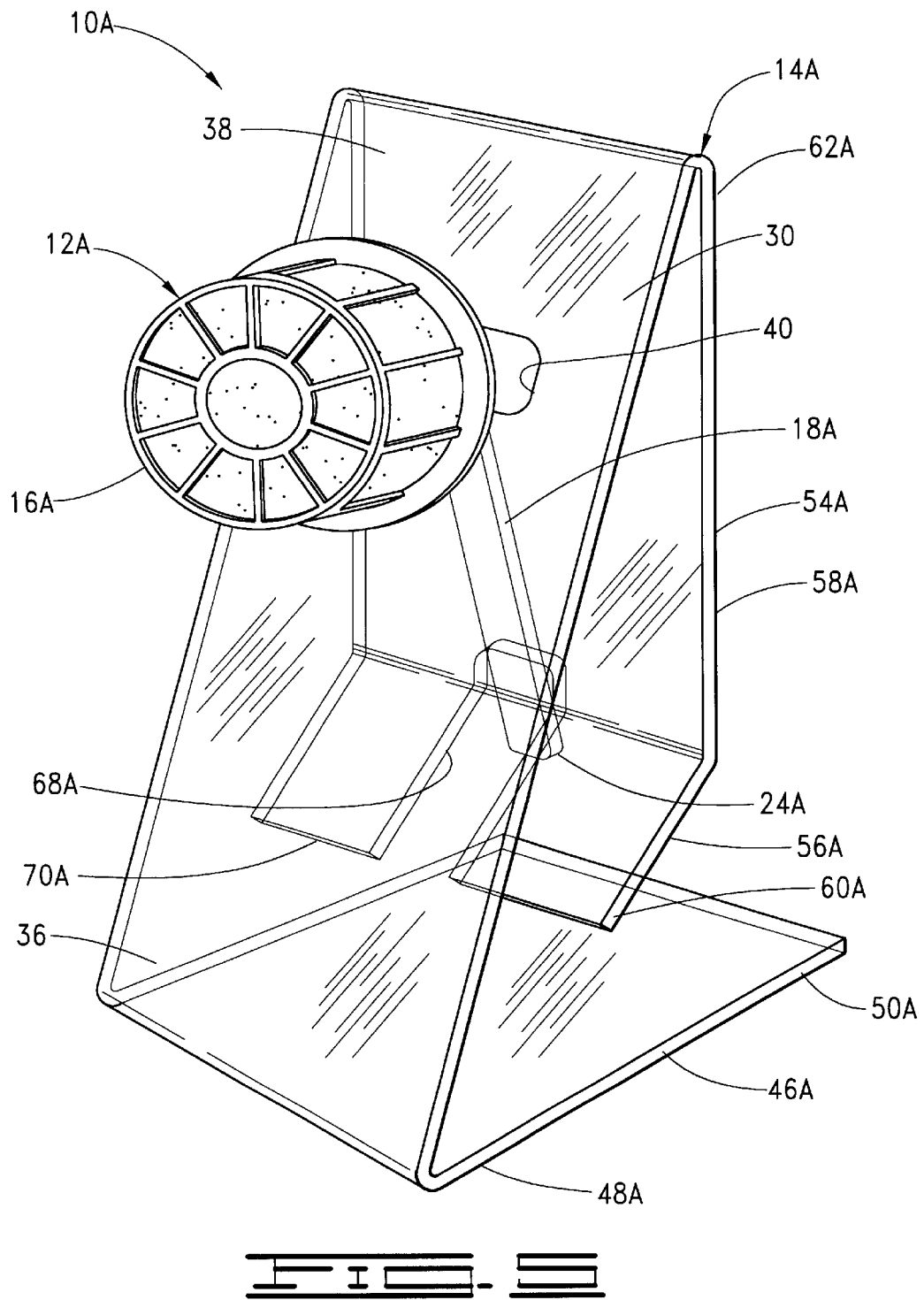
FIG. 5 is a right, frontal perspective view of a stand constructed in accordance with a second embodiment of the present invention. A bouquet holder with a straight handle is shown supported in the stand.

The bouquet holder 12 generally comprises a floral portion 16 and an elongate, resilient stem 18. The floral portion 16 is attached to one end 22 of the stem 18, while the other end 24 of the stem is a free end. The floral portion 16 typically is a plastic cage filled with florist foam. The stem 18 may be curved, as shown in FIG. 1, or straight as shown in FIG. 5. A common type of bouquet holder is described in U.S. Pat. No. 5,454,189 issued in the name of Graham et. al., the contents of which are incorporated herein by reference.

With continued reference to FIG. 1 and now also to FIGS. 2–4, the first preferred embodiment of the stand 14 will be described. In this embodiment, the stand 14 comprises a front panel 30 with a front face 32, a rear face 34, a bottom end 36 and a top end 38. The front panel 30 defines at least one receiving opening 40 adapted to receive the free end 24 of the stem 18 of the bouquet holder 12. In this way, as illustrated in FIG. 1, the floral portion 16 of the bouquet holder 12 is supportable on the front face 32 of the front panel 30, while a portion of the stem 18 extends behind the front panel.

The stand 14 preferably includes a bottom panel 46 having a front end 48 and a rear end 50. The bottom end 36 of the front panel 30 attaches to the front end 48 of the bottom panel 46, and the front panel extends upwardly from the bottom panel 46. Preferably, the front panel 30 extends at an acute angle from the bottom panel 46.

The stand 14 also preferably comprises a back panel 54. The back panel 54 includes a first panel portion 56 and a second panel portion 58. The first panel portion 56 terminates at a first free end 60, and the second panel portion 58 terminates in an opposite or second end 62. In this embodiment, the back panel 54 is flat. That is, the first and second panel portions 56 and 58 are coplanar; the back panel defines a single, non-angled plane. The second end 62 attaches to the rear end 50 of the bottom panel 46 and extends upwardly therefrom, and the back panel 54 forms an acute angle with the bottom panel 46. Thus, the first panel portion 56 of the back panel 54 is supported non-parallel to the front panel 30.

The free first end 60 of the back panel 54 is provided with a notch 68 forming a notched edge 70 spaced a distance behind the front panel 30. The notched edge 70 is adapted to receive the free end 24 of the stem 18 of the bouquet holder 12 so that the bouquet holder is stabilized in the stand 14.

The Embodiment of FIGS. 5–8

With reference now to FIG. 5, there is shown therein an assembly 10A illustrating the use of a bouquet holder 12A with a straight stem 18A and a stand 14A constructed in accordance with a second preferred embodiment of the present invention. As mentioned previously, in this embodiment, the stem 18A is straight rather than curved.

The stand 18A is similar in structure to the stand 18 of FIGS. 1–4. However, in this embodiment, the second end 62A of the back panel 54A is attached to the top end 38 of the front panel 30. In addition, the first panel portion 56A is angled relative to the second panel portion 58A. Thus, the second panel portion 58A extends downwardly from the top end 38 of the front panel 30, and the first panel portion 56A extends inwardly from the second panel portion toward the rear face 34 of the front panel 30.

Now it will be appreciated that the three components of the preferred embodiments of the stand of this invention—the front panel, the back panel and the connecting support or bottom panel—can be attached to each other in a variety of ways. They can be glued or welded or attached by various types of connectors to form a fixed attachment. Alternately, a hinged connection can be provided. However, in the preferred practice of this embodiment, all three panels are integrally formed of a single sheet of transparent plastic and simply folded into the configurations depicted in the FIGS. This will provide some desired flexibility at the folds to facilitate placement of the stem of the bouquet holder in the stand. Regardless of the material of manufacture or the nature of the connection between the panels, however, it is advantageous to ensure that the first panel portion of the back panel is flexibly supported relative to the front panel. This will facilitate insertion of the free end of the stem in the notch during placement of the bouquet holder in the stand and yet stabilize the stem after placement.

Having described two preferred embodiments of the stand of the present invention, the preferred use of the stand and the assembly will be explained. Usually, the stand 18 or 18A will be placed first on a suitable work surface. A bouquet holder, such as the bouquet holder 12 or 12A is selected. The free end 24 or 24A is inserted through the opening 40 in the front panel, and snapped into the notch 68 or 68A. To do this, the first panel portion 56 or 56A is flexed slightly to facilitate the sliding movement of the stem 18 or 18A into the notch.

It will not be apparent that either the stand 14 or 14A can be used for the straight-stemmed bouquet holder 12A. Similarly, either stand 14 or 14A can be used for the curved-stemmed bouquet holder 12. The particular combinations shown are merely for illustration purposes.

Having installed the bouquet holder 12 or 12A in the stand 14 or 14A, the floral arrangement can be completed. Then, the assembly 10 or 10A can be transported or displayed or both without removing the bouquet from the stand.

Now it will be appreciated that the stand of the present invention provides the floral industry with an attractive and versatile support for holding floral devices during the formation of an arrangement. The stand is designed to maintain the floral device at a convenient height above a conventional work surface, and at a comfortable angle off vertical. The stand can be placed on any flat work surface, and can even be hung on a wall. Because of its versatility, the stand can be used to make arrangements, and to store, ship and display the arrangements, eliminating the extra devices otherwise required and the time and inconvenience associated therewith. The stand is attractive yet inconspicuous, so it can be used as a display at any event or ceremony without detracting from a particular floral theme.

Changes may be made in the combination and arrangement of the various parts and elements described herein without departing from the spirit and scope of the invention as defined in the following claims.

What is claimed is:

1. A stand for supporting a bouquet holder, wherein the bouquet holder comprises a floral portion and an elongate stem, wherein the floral portion is attached to one end of the stem, and wherein the other end of the stem is a free end, the stand comprising:

a front panel having a front face and a rear face, wherein the front panel defines at least one receiving opening adapted to receive the free end of the stem of the bouquet holder so that the floral portion is supported on the front face of the front panel and a portion of the stem extends behind the front panel; and a back panel comprising a first panel portion supported non-parallel to the front panel, wherein the first panel portion has a notched edge spaced a distance behind the front panel and adapted to receive the free end of the stem of the bouquet holder when the stem is inserted through the receiving opening in the front panel with the free end extending behind the front panel so that the bouquet holder is stabilized in the stand.

2. The stand of claim 1 further comprising a bottom panel having a front end and a rear end, wherein the front panel has a bottom end and a top end, and wherein the bottom end of the front panel extends upwardly from the front end of the bottom panel.

3. The stand of claim 2 wherein the front panel extends at an acute angle from the bottom panel.

4. The stand of claim 3 wherein the back panel extends upwardly from the rear end of the bottom panel.

5. The stand of claim 4 wherein the back panel defines a single plane.

6. The stand of claim 5 wherein the front panel, the back panel and the bottom panel are integrally formed of a single sheet of flexible plastic.

7. The stand of claim 6 wherein the plastic is transparent.

8. The stand of claim 1 wherein the back panel further comprises a second panel portion, wherein the first panel portion terminates in a first end and the second panel portion terminates at a second end, wherein the first end comprises a notch to form the notched edge of the first panel portion, wherein the second end of the second panel portion connects to the top end of the front panel, wherein the second panel portion extends downwardly from the front panel and wherein the first panel portion extends inwardly from the first end of the second panel portion toward the rear face of the front panel.

9. The stand of claim 8 wherein the first and second panel portions both are planar and together define an obtuse angle.

10. The stand of claim 9 wherein the front panel extends at an acute angle to the bottom panel.

11. The stand of claim 10 wherein the front panel, the back panel and the bottom panel are integrally formed of a single sheet of flexible plastic.

12. The stand of claim 1 wherein the first panel portion is flexibly supported relative to the front panel to facilitate insertion of the free end of the stem in the notch during placement of the bouquet holder in the stand and yet stabilize the stem after such placement.

13. A bouquet holder assembly comprising:
   a bouquet holder comprising a floral portion and an elongate stem, wherein the floral portion is attached to one end of the stem, and wherein the other end of the stem is a free end; and
   a stand comprising:
      a front panel having a front face and a rear face, wherein the front panel defines at least one receiving opening adapted to receive the free end of the stem of the bouquet holder so that the floral portion is supported on the front face of the front panel and a portion of the stem extends behind the front panel; and
      a back panel comprising a first panel portion supported non-parallel to the front panel, wherein the first panel portion has a notched edge spaced a distance behind the front panel and adapted to receive the free end of the stem of the bouquet holder when the stem is received in the receiving opening in the front panel with the free end extending behind the front panel so that the bouquet holder is stabilized in the stand.

14. The assembly of claim 13 further comprising a bottom panel having a front end and a rear end, wherein the front panel has a bottom end and a top end, and wherein the bottom end of the front panel extends upwardly from the front end of the bottom panel.

15. The assembly of claim 14 wherein the front panel extends at an acute angle from the bottom panel.

16. The assembly of claim 15 wherein the back panel extends upwardly from the rear end of the bottom panel.

17. The assembly of claim 16 wherein the back panel defines a single plane.

18. The assembly of claim 17 wherein the front panel, the back panel and the bottom panel are integrally formed of a single sheet of flexible plastic.

19. The assembly of claim 18 wherein the plastic is transparent.

20. The assembly of claim 14 wherein the back panel further comprises a second panel portion having a first end and a second end, wherein the first panel portion extends from the first end of the second panel portion, wherein the second end of the second panel portion connects to the top end of the front panel, wherein the second panel portion extends downwardly from the front panel and wherein the first panel portion extends inwardly from the first end of the second panel portion toward the rear face of the front panel.

21. The assembly of claim 20 wherein the front panel extends at an acute angle to the bottom panel.

22. The assembly of claim 21 wherein the front panel, the back panel and the bottom panel are integrally formed of a single sheet of flexible plastic.

23. The assembly of claim 22 wherein the plastic is transparent.

24. The assembly of claim 13 wherein the first panel portion is flexibly supported relative to the front panel to permit insertion of the free end of the stem in the notch during placement of the bouquet holder in the stand and yet stabilize the stem after such placement.

25. The assembly of claim 13 wherein the stem of the bouquet holder is straight.

26. The assembly of claim 13 wherein the stem of the bouquet holder is curved.

* * * * *